United States Patent
Little (10) Patent No.: US 7,359,593 B2
(45) Date of Patent: Apr. 15, 2008

(54) INTEGRATED OPTICAL MODE SHAPE TRANSFORMER AND METHOD OF FABRICATION

(75) Inventor: Brent E. Little, Glen Head, NY (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 11/443,561

(22) Filed: May 31, 2006

(65) Prior Publication Data

US 2006/0285797 A1 Dec. 21, 2006

Related U.S. Application Data (63) Continuation of application No. 10/684,899, filed on Oct. 9, 2003, now Pat. No. 7,079,727.

(51) Int. Cl.
*G02B 6/26* (2006.01)
(52) U.S. Cl. ............ 385/30; 385/28; 385/43
(58) Field of Classification Search ............ None
See application file for complete search history.

(56) References Cited

U.S. PATENT DOCUMENTS

| | | | |
|---|---|---|---|
| 5,199,092 A | 3/1993 | Stegmueller | |
| 5,703,895 A | 12/1997 | Ghirardi et al. | |
| 6,108,478 A | 8/2000 | Harpin et al. | |
| 6,229,947 B1 | 5/2001 | Vawter et al. | |
| 6,253,099 B1 | 6/2001 | Oskin et al. | |
| 6,411,764 B1 | 6/2002 | Lee | |
| 6,760,520 B1 | 7/2004 | Medin et al. | |
| 2002/0039469 A1 | 4/2002 | Jeong et al. | |
| 2002/0085602 A1 | 7/2002 | Park et al. | |
| 2003/0044118 A1 | 3/2003 | Zhou et al. | |
| 2003/0053756 A1* | 3/2003 | Lam et al. | 385/49 |
| 2004/0017976 A1* | 1/2004 | Luo et al. | 385/43 |
| 2004/0114869 A1* | 6/2004 | Fike et al. | 385/43 |

OTHER PUBLICATIONS

Y. Shani, "Efficient coupling of a semiconductor laser to an optical fiber by means of a tapered waveguide on silcon", Applied Physics Letters, vol. 55, No. 23, pp. 2389-2391, 1989.

(Continued)

*Primary Examiner*—Tina M. Wong
(74) *Attorney, Agent, or Firm*—Dunlap, Codding & Rogers, P.C.

(57) ABSTRACT

An integrated optical mode transformer provides a low loss interconnection between an optical fiber and an integrated optic waveguide having a spot size different from that of the fiber. The mode transformer is comprised of two waveguide layers, an upper layer and a lower layer, with the upper layer being contiguous to the lower layer. The lower layer is the integrated optic waveguide layer forming the optical circuit. The input dimensions of the composite two-waveguide structure supports a fundamental mode that accepts all of the light present on the optical fiber. The upper waveguide layer is tapered down from an input width to an output width and then terminates in such a way that at the termination substantially all of the input optical power resides in the lower waveguide layer. The two-waveguide layer structure is fabricated by deposition and planarization techniques.

17 Claims, 12 Drawing Sheets

OTHER PUBLICATIONS

T. Brenner et al., Integrated optical modeshape adapters in InGaAsD/Inp for efficient fiber-to-waveguide coupling; IEEE Photonics Tech. Letters, vol. 5, No. 9, pp. 1053-1056, 1993.

R. Zengerle et al.,"Laterally tapered InP-InGaAsP waveguides for low loss chip-to-fiber butt coupling: A comparison of different configurations" IEEE Phontonics Tech letters, vol. 7, No. 5, pp. 532-534, 1995.

B. Rahman et al., "Improved Laser-Fiber coupling by using Spot-sized transformer," IEEE Photonics Technology Letters, vol. 8, No. 4, pp. 557-559, 1996.

G. Vawter et al., "Tapered rib Adiabatic following fiber couplers in etched GaAs materials for monolithic spot-size transformation," IEEE J. Selected topics Quantum Elect., vol. 3, No. 6, pp. 1361-1371, 1997.

I. Moerman et al., "A review on Fabrication technologies for the monolithic integration of tapers with III-V semiconductor devices," IEEE J. selected topics Quantum Elect., vol. 3, No. 6, pp. 1308-1320, 1997.

Schwander et al., Simple and Low-Loss Fibre-To-Chip Coupling by Integrated Field-Matching Waveguide IN InP, Electronics Letters, vol. 29, No. 4, Feb. 1993, pp. 326-328.

* cited by examiner

Lateral Cross Section View

◨ Fiber matched guide
▨ Bus core
▫ Bottom cladding
⦂ Top cladding

Longitudinal Cross Section View

Figure 6

| Top-Down | Lateral Cross-Section | Longitudinal Cross-Section |
|---|---|---|
|  |  |  |

Step 1

Step 2

Step 3

Figure 7-1

|  | Lateral Cross-Section | Longitudinal Cross-Section |
|---|---|---|
| Top-Down | | |

Step 4

Step 5

Step 6

INTEGRATED OPTICAL MODE SHAPE TRANSFORMER AND METHOD OF FABRICATION

CROSS-REFERENCE TO RELATED APPLICATIONS

The present application is a continuation of U.S. Ser. No. 10/684,899, filed on Oct. 9, 2003, now U.S. Pat. No. 7,079,727, the entire content of which is hereby incorporated herein by reference.

BACKGROUND OF THE INVENTION

1. Field of Invention

This invention relates to a structure for the low loss connection of an optical fiber to an integrated optical waveguide having different dimensions from the fiber. More specifically it relates to a mode shape transformer fabricated as an integrated optical waveguide structure that is used for changing the shape and dimension of an optical mode field of an integrated optical waveguide so that it matches the mode field shape of an input optical fiber.

2. Background of the Invention

The invention relates to the field of semiconductor and dielectric optical components used for optical transmission or optical digital data processing. It pertains especially to all optical components comprising active and/or passive waveguides and also to single and multimode fibers, for example, components such as semiconductor lasers, semiconductor amplifiers, modulators, and wavelength filters, to name a few. There is a great deal of ongoing research and development effort to reduce the cost and size of optical modules while maintaining the minimum loss of optical power. A major component of the fabrication costs usually arises from the joining of such components to optical fibers, as for example when it is necessary to couple optical modes of very different sizes. Thus, when a high-index contrast (HC) waveguide and a flat-end single-mode optical fiber are joined together, the optical mode of the HC guide spot size with a diameter of, for example, 1-2 µm, has to be coupled with the optical mode of a single mode (SM) optical fiber whose diameter is far greater, for example, in the range of 6-10 µm.

To enable the coupling of these optical modes of very different sizes, spot-size converters or mode shape transformers (or mode transformer for short) are made in order to increase the size of the mode at the output of the optical component and make its profile compatible with that of the mode guided in the optical fiber. The reverse can also be accomplished to decrease the size of the mode from a single mode (SM) fiber to a high-index contrast (HC) waveguide. In any case, this mode matching must be done while preserving the performance characteristics of the component.

Figure 1:
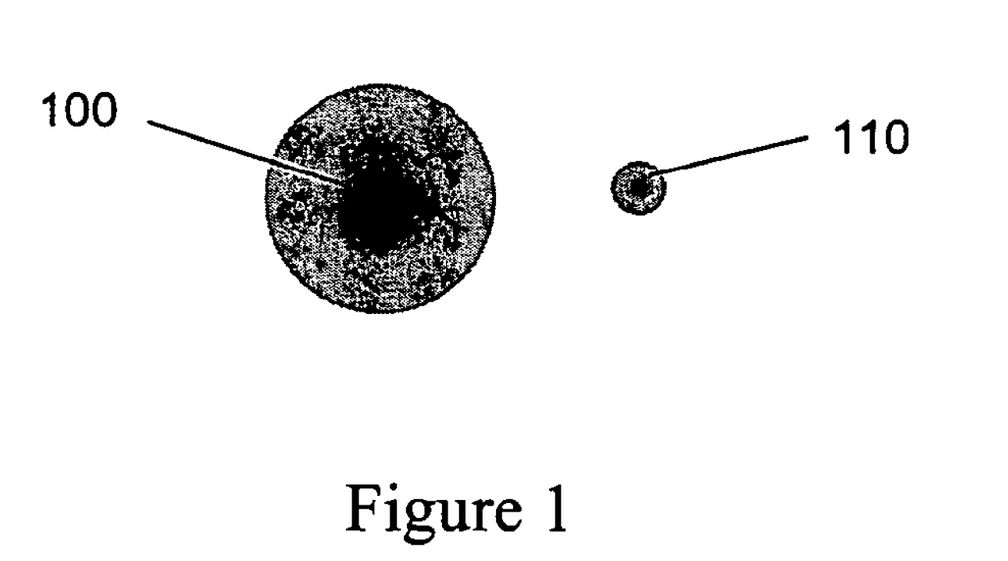
FIG. 1 shows the relative sizes of a single mode fiber spot size and that of a high index contrast waveguide.

For instance, in directly connecting a SM fiber having a mode spot size of 8 µm, to a HC waveguide having a spot size of 1.5 µm, over 90% of the power will be lost. Such loss is intolerable in optical communication systems. FIG. 1 shows the relative sizes of the modes (field patterns) of a conventional SM fiber (100), and that of an HC waveguide. (110). The SM fiber spot size is typically 5-10 µm which is as much as an order of magnitude greater than that of an HC waveguide—typically 1-2 µm.

When transforming the modes between two waveguides with different refractive index and/or core sizes, high coupling loss arises due to the difference in mode size, shape, and mode velocity. For example, the index difference and the mode size of a fiber optic waveguide are different than those of a high index difference planar waveguide, resulting in high coupling loss when the fiber optic waveguide and the high index difference planar waveguide are directly coupled.

A channel waveguide is a dielectric waveguide whose core is surrounded by a cladding that is comprised of materials with refractive indices lower than that of the core, and wherein the peak optical intensity resides in the core. Waveguides in general can be defined by other geometries as well. In all waveguide cases, the cladding is defined as a region where the evanescent field of optical modes exists. A high index contrast (HC) waveguide is defined as one where the core cladding index contrast is larger than that of a typical single mode fiber (that is, larger than approximately 1%). HC waveguides also typically have mode field diameters that are smaller than that of a single mode fiber by a factor of two or more.

Figure 2:
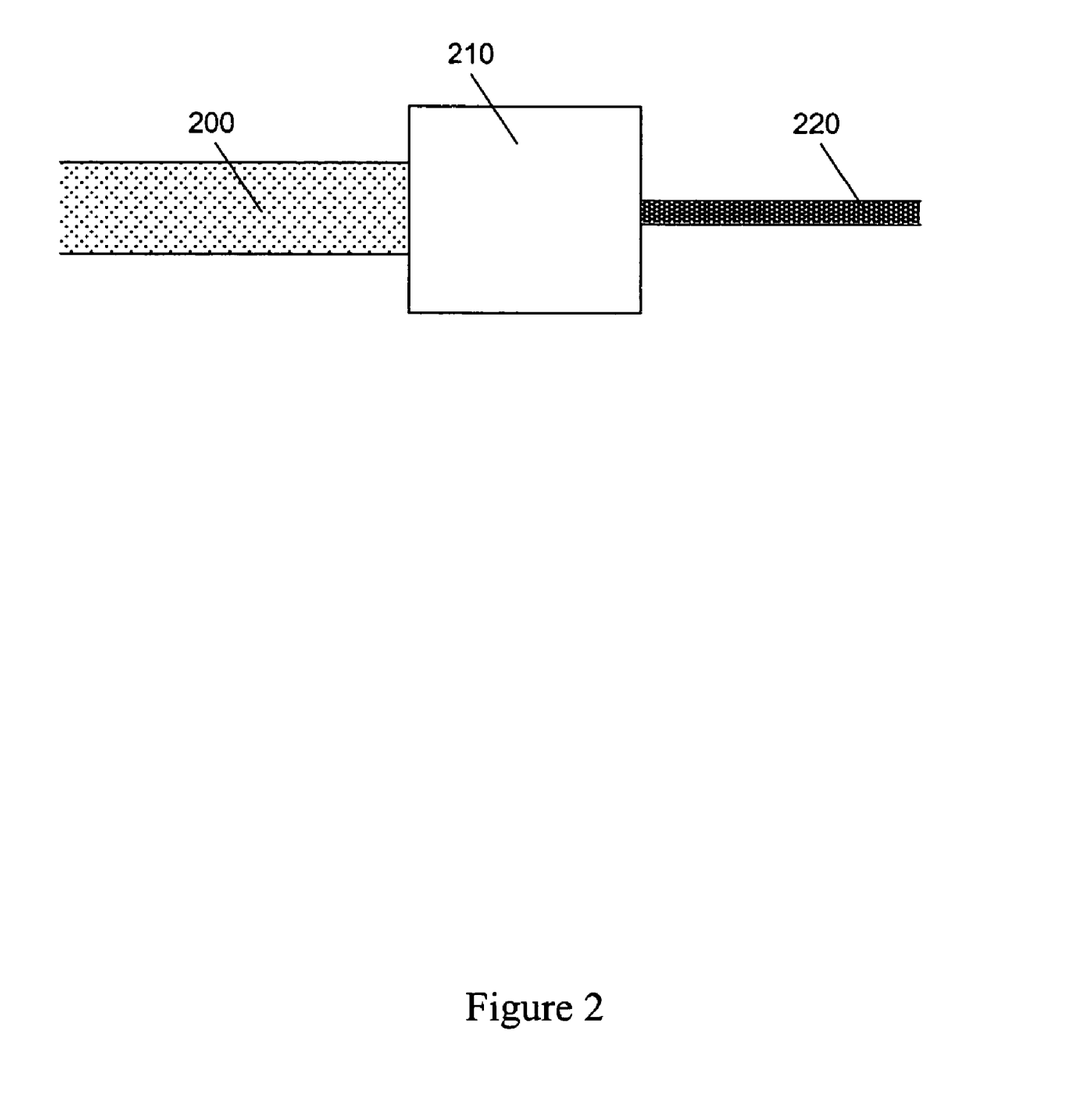
FIG. 2 shows a functional block diagram of a mode shape transformer.

In optical components, it is essential to have low coupling loss when attaching a fiber to a microchip. To efficiently couple two waveguides with very different dimensions and therefore two different spot sizes, some sort of mode shape transformer is required. As shown in FIG. 2, the mode shape transformer essentially acts as a funnel, necking down a wide area spot from the SM fiber (200) to a small area spot associated with the HC waveguide (220). FIG. 2 depicts the functionality of such a mode transformer (210)

A mode transformer between two different waveguides is an essential part of an optical system where the lightwave (mode) from one optical component is coupled into another component. In optical communication, a mode transformer between an optical fiber waveguide and a high index difference (difference in the refractive indices of core and cladding) planar waveguide is crucial for successful implementation of planar lightwave circuits (PLC) in fiber communication. Therefore, developing an efficient mode transformer between two waveguides has continued to be a subject of intense development.

In addition, the core index of the fiber optic waveguide is lower than that of the high index difference planar waveguide causing a mode velocity difference between two waveguides. As will be detailed in the Detailed Description section, when such a change in mode properties takes place too quickly, high power loss arises.

3. Prior Art

There have been several other approaches to achieve efficient mode coupling between two waveguides with different index difference, including mode transformation by tapering the dimension of high index difference waveguides. Mode transformation by a taper has been shown in various publications. Over the tapering region of the high index difference waveguide, the thickness or width of the waveguide core is gradually tapered down from that of the normal guiding region to a lower thickness or width. As the mode travels from the normal guiding region of the high index difference waveguide into the tapering region, the mode experiences decreasing amount of the core material. The fraction of the mode field distribution that exists outside the core material increases, changing the mode size. The index of the waveguide that the mode experiences is effectively changed by the presence of the taper. In other words, the "effective index" is gradually changed by the taper. By gradually changing the effective index from that of the low index waveguide to that of the high index difference waveguide, the mode coupling can be achieved between two waveguides without high loss. The method to determine the effective index is described in "The Handbook of Photonics", Boca Raton, Fla., CRC Press, 532-535 (1996) by M. Gupta.

T. Brenner et. al. ("Integrated optical modeshape adapters in InGaAsP/InP for efficient fiber-to-waveguide coupling," IEEE Photonics Tech. Lett. Vol. 5, No. 9, 1993) shows a mode transformer using a vertically tapered high contrast waveguide. Vertical tapering uses special etching techniques that are not well-controlled and therefore difficult to manufacture. Also the vertical taper shape cannot be arbitrarily specified but is more a function of etching characteristics, rather than design. The mode size propagating in the tapered region increases due to the reduction of the effective index, and thus the reduction of the effective index difference. The publication indicates the gradual mode transformation occurring in one waveguide due to the presence of a taper.

U.S. Pat. No. 5,199,092, issued to Stegmueller et al., shows the coupling of modes between two different waveguides: one broad and one narrow. The two waveguides run parallel to one another and are superimposed with each other to provide superimposing waveguide guidance. During the superimposed waveguide guidance, one of the two waveguides is tapered down in vertical dimension, while the other waveguide dimension is kept constant. The role of the tapered waveguide is to provide a gradual effective index change, and thus mode transformation, in the same manner as the cases cited in journal publications including that by Brenner et al. The difference is the superimposition of the narrow waveguide, providing waveguiding in the broad waveguide once the narrow waveguide is completely terminated by the vertical taper. The broad waveguide is surrounding the narrow waveguide over the whole waveguiding distance. The presence of the broad waveguide helps guiding the mode once the mode transformation is complete.

In addition to single taper devices described above, dual tapers are used in mode transformation between two different waveguides. IEEE Photonic Technology Letters, Vol. 7, No. 5, May 1995 by Zengerle et al., reports a mode transformer having two channel waveguides, each with a taper, one sitting on top of the other. Electronics Letters, Vol. 29, No. 4, February 1993 by Schwander et al., reports a mode transformer having two rib waveguides, each with a taper, a portion of one embedded within the other. Both of the rib waveguides used in the art are weakly guiding. This is not a suitable method for mode transformation to or from a high index difference waveguide.

Y. Shani et. al. ("Efficient coupling of a semiconductor laser to an optical fiber by means of a tapered waveguide on silicon", Appl. Phys. Lett. vol. 55, No. 23, 1989) describes a mode transformer using a taper embedded within a second larger waveguide. Their taper is however adiabatic. In that case, the taper was wedge shaped (linearly tapered) and very long in order to make use of the adiabatic mechanism. The taper is required to also come down to a sharp point, which makes it almost impossible to perform in a lithographic process.

B. M. A. Rahman et. al. ("Improved laser-fiber coupling by using spot-size transformer", IEEE Photonics Technology Lett. Vol. 8, No. 4, 1996) describes a mode transformer using two synchronously coupled waveguides, where one guide is a smaller, high contrast guide and the other has a spot size approximating the size of a fiber mode. Their mode transformer does not use any mode evolution process, and the coupling is not terminated, causing coupling to periodically transfer between the two guides indefinitely.

G. A. Vawter et. al. ("Tapered rib adiabatic following fiber couplers in etched GaAs materials for monolithic spot-size transformation," IEEE J. Selected Topics Quantum Electronics, Vol. 3, No. 6, 1997) shows an adiabatic coupler from one waveguide to another where the high contrast waveguide is on top of the larger fiber-matched waveguide.

Variations of the above types of mode transformers can also be found in several review articles, including that by I. Moerman et. al. (A review of fabrication technologies for the monolithic integration of tapers with III-V semiconductor devices," IEEE J. of Selected Topics Quantum Electronics," Vo. 3, No. 6, 1997) which summarizes primarily dual type waveguide tapering.

In U.S. Pat. No. 6,253,009 entitled "SEMICONDUCTOR OPTICAL COMPONENT COMPRISING A SPOT-SIZE CONVERTER", the invention relates more particularly to a semiconductor optical component, comprising an active waveguide and a passive waveguide that are superimposed and buried in a sheathing layer, wherein the component comprises successively: a damped coupling section in which the width of the active waveguide tapers down and the width of the passive waveguide increases, and a mode expansion section comprising only the passive waveguide whose width tapers down. According to another characteristic of the invention, the component furthermore comprises a transition section positioned between the damped coupling section and the mode expansion section, in which the width of the active waveguide tapers down to 0 µm. The invention enables the making of an optical component comprising an integrated spot-size converter, wherein the optical mode is chiefly deconfined in the passive guide so much so that the current threshold and the efficiency of the component are not affected. The passive and active waveguides are not aligned but they are coupled vertically, so much so that the problems related to alignment are prevented. Furthermore, the two types of active and passive waveguide may be optimized separately.

A third approach that has been envisaged in order to obtain a spot-sized converter integrated into an optical component requires an active waveguide and a passive waveguide that are superimposed so as to create a damped vertical coupling zone, wherein the width of the active waveguide tapers down gradually to deconfine the mode, and the width of the passive waveguide increases very rapidly and then becomes constant throughout the length of this section. The two guides, namely the active guide and the passive guide, are furthermore buried in a sheathing layer. In this case, the width of the coupling section must be sufficient to enable complete deconfinement of the optical mode in the entire active guide. This length is generally greater than 150 µm. Furthermore, as and when it gets deconfined, the optical mode transits through the passive guide. The passive guide has a constant width of about 4 µm and a very small thickness of about 50 nm to enable the deconfinement of the mode. For, an excessive thickness of this passive guide would prevent the deconfinement of the mode in the active guide. This is why the passive generally has a thickness of less than 100 nm.

The major drawback of this approach lies in the fact that the deconfinement of the mode is done entirely in the active guide. This leads to a deterioration of the performance characteristics of the component, especially its threshold current and its efficiency. Furthermore, the optical coupling losses with a single-mode optical fiber are still high. They are about 4.5 dB.

None of the prior art provides for an efficient mode transformation between a low index difference and a high index difference waveguide on a microchip. This invention discloses, for the first time, an efficient optical mode transformer based on a taper design, useful for transforming the mode to a high index difference waveguide on a semiconductor microchip. The matching of the optical mode according to the invention is performed chiefly in the HC waveguide that is embedded on the semiconductor microchip.

BRIEF DESCRIPTION OF THE DRAWINGS

FIG. 7 shows a series of steps in the fabrication of one embodiment of present mode shape transformer invention.

FIG. 8 shows an alternate series of steps in the fabrication of one embodiment of present mode shape transformer invention.

DETAILED DESCRIPTION OF THE INVENTION

The following description will further help to explain the inventive features of the Optical Mode Shape Transformer.

The approach used in this invention is to separate the problem into two steps with definitive objectives. The first objective is to get optical power from the SM fiber onto the chip with the highest possible efficiency. Once high efficiency connectivity and optical power transmission is established onto the chip, power is then transferred into the HC waveguide via an on chip mode transformer.

Figure 3:
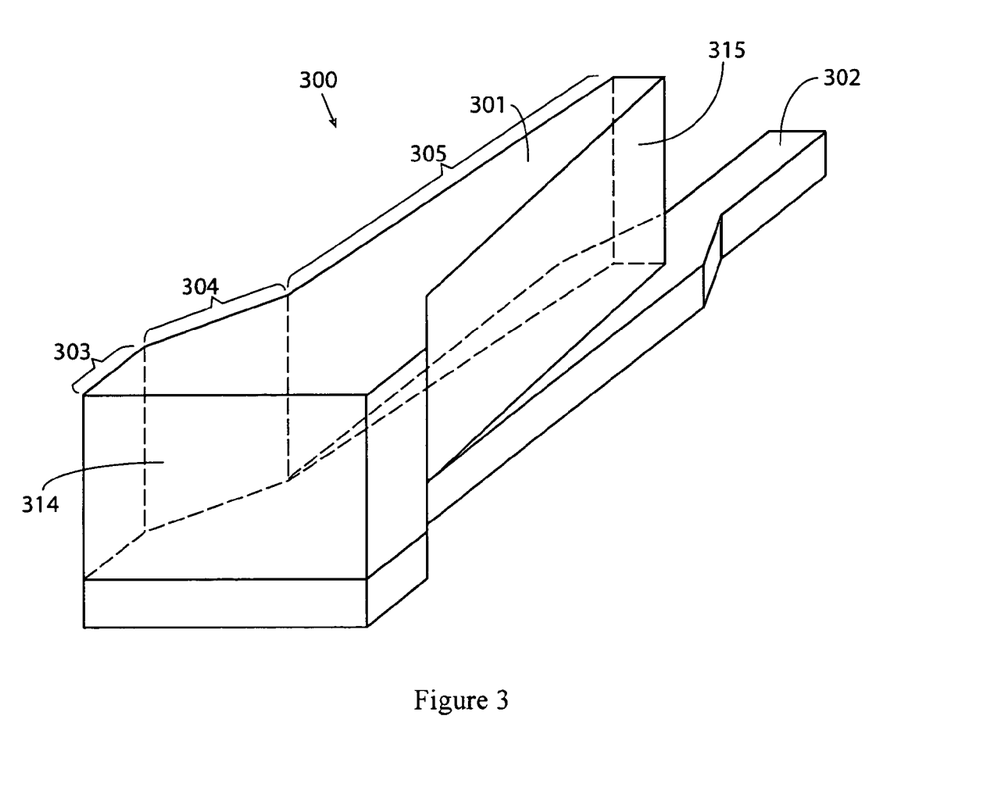
FIG. 3 shows a perspective view of one embodiment of the present mode shape transformer invention.

FIG. 3 shows a perspective view of the mode shape transformer. The mode transformer has two waveguide layers, one contiguously on top of the other. The first layer (302), also called the bottom layer, is the core of the HC waveguide layer that makes up the rest of chip's optical circuit. This waveguide is often called the "bus". The second layer (301), which is on top of the first, is usually a much thicker layer and in conduction with the first layer, is used to capture all of the light from an optical fiber. The refractive index of each layer may be different. When both waveguides are taken together, we call the structure the "compound waveguide" or "composite waveguide". The composite waveguide supports a fundamental optical mode which we call the "fundamental mode of the composite waveguide". The HC bus by itself (in the absence of the second layer), supports a fundamental waveguide mode which we call the HC mode. We are interested in capturing all the power from an optical fiber into the HC mode. The second layer, and its associated geometry, facilitates this power transfer.

Figure 4:
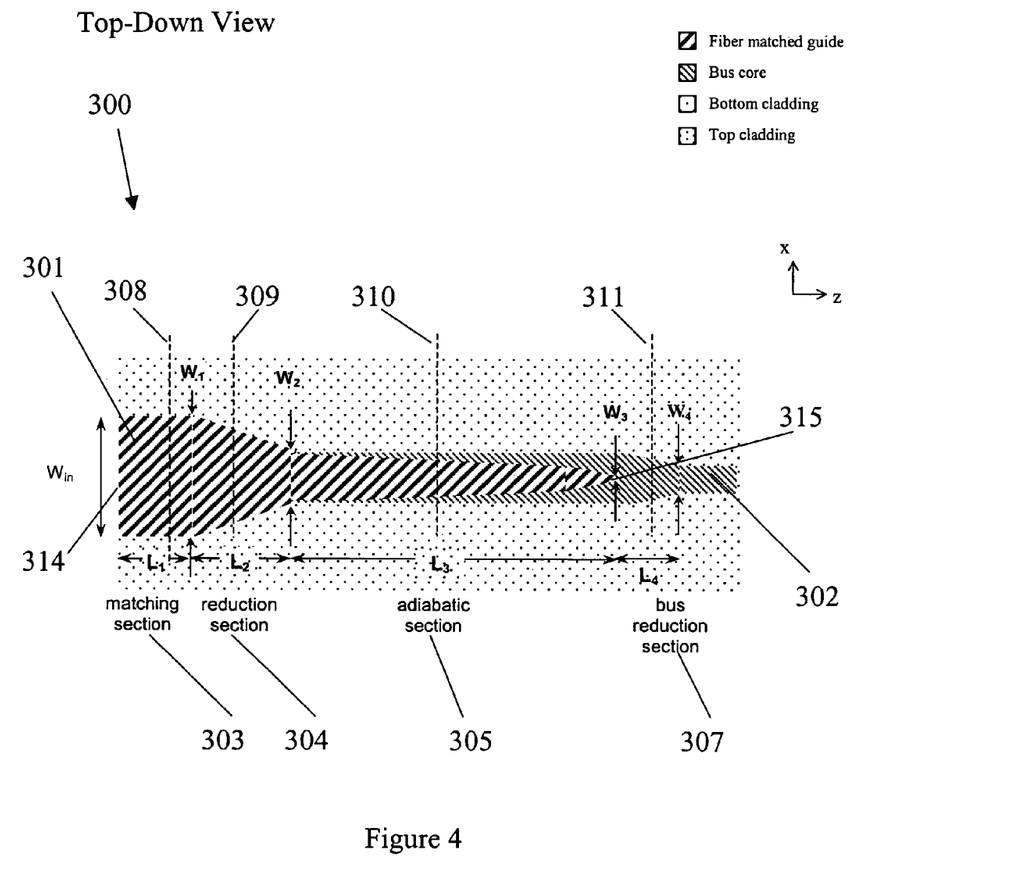
FIG. 4 shows a top-down view of one embodiment of the present mode shape transformer invention.

FIG. 4 shows a top-down view of the mode shape transformer that was shown in FIG. 3, and highlights its salient features. Cross-sections at various positions along the mode transformer in FIG. 4 are shown with corresponding numerals in FIG. 5. The mode transformer can have four or more longitudinal sections. Not all sections are necessarily needed. They each help to maximize the power transfer efficiency and minimize the overall length of the device. The purpose of each section is now described.

Figure 5A:
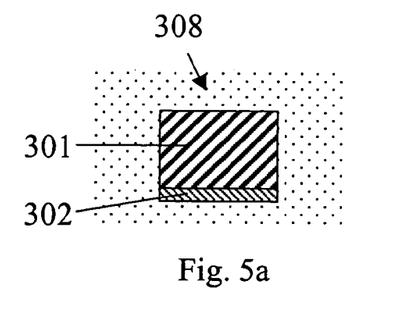
FIG. 5 shows a lateral cross sectional view of one embodiment of present mode shape transformer invention.

Section 1. Fiber mode matching section. The fiber mode matching section is shown in FIG. 4 (303). A cross section of the mode matching section along the dashed line in FIG. 4 (308) is shown in FIG. 5a (308). The purpose of this section is to match the spot size of the optical fiber to that of the composite waveguide comprising of the bottom (302) and top (301) guiding layers. The cross sectional dimensions of the composite structure (that is, its height and width) are chosen so as to optimize this spot size matching. This section facilitates the coupling of a fiber to a chip, while the following sections serve to reduce the spot size and couple the power into the HC mode. The length of the mode matching section (303) is arbitrary, but is made sufficiently long so that there is room to dice and polish the chip without affecting the following sections.

Figure 5B:
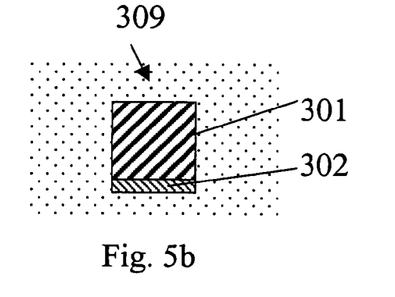

Section 2. Lateral mode reduction section. The lateral mode reduction section is shown in FIG. 4 (304). A cross section of the lateral mode reduction section along the dashed line in FIG. 4 (309) is shown in FIG. 5b (309). In this section the lateral width of both top (301) and bottom (302) waveguide layers are simultaneously reduced (tapered) from $W_1$ down to $W_2$, as shown in FIG. 4. The length $L_2$ is chosen long enough so that there is no optical loss, or any optical mode conversion from the fundamental mode of the composite waveguide to higher order modes of the composite waveguide. The width $W_2$ is usually optimized to maximize transformer efficiency while minimizing length, but in general will be about 2 μm to 4 μm. Its exact value is not critical. The taper shape shown in FIG. 4 is linear, but can be other shapes such as parabolic or exponential. The taper shape can be optimized to maximize transformer efficiency and/or minimize transformer length.

Figure 5C:
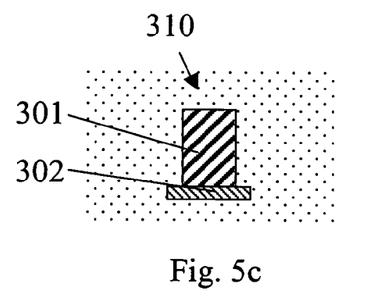

Section 3. Adiabatic taper region. The adiabatic taper section is shown in FIG. 4 (305). A cross section of the lateral mode reduction section along the dashed line in FIG. 4 (310) is shown in FIG. 5c (310). In this section, the top waveguide (301) is tapered down from $W_2$ to $W_3$, over a length of $L_3$, as shown in FIG. 4. The bus portion of the composite guide (302) is usually not tapered down, or is tapered down only slightly. In this section, the power residing in the top waveguide is coupled to, and forced downward, into the bottom bus waveguide. At the end of this section most of the power resides in the lower bus waveguide. The top waveguide (301) terminates with a certain width $W_3$, after a length $L_3$. The taper length $L_3$ is made long enough so that there is no radiation losses, and no mode conversion of power to higher order modes of the composite waveguide. $W_3$ is usually optimized to maximize transformer efficiency, while minimizing length, but in general will be about 0.0 μm to 1.0 μm. The minimum width is usually limited by lithographic patterning of the feature. The reason this section is called adiabatic is because the location of the bulk of the optical power changes from the top guide to the bottom guide without radiation loss or without excitation to the higher order modes. The adiabatic taper shape in FIG. 4 is shown to be linear, but can be other shapes such as parabolic or exponential. The taper shape can be optimized to maximize transformer efficiency and/or minimize transformer length.

Figure 5D:
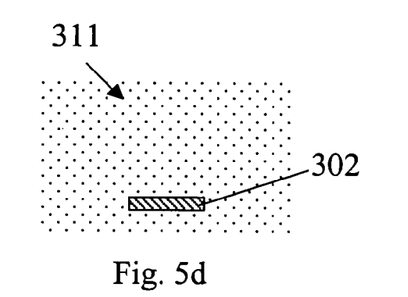
Figure 6:
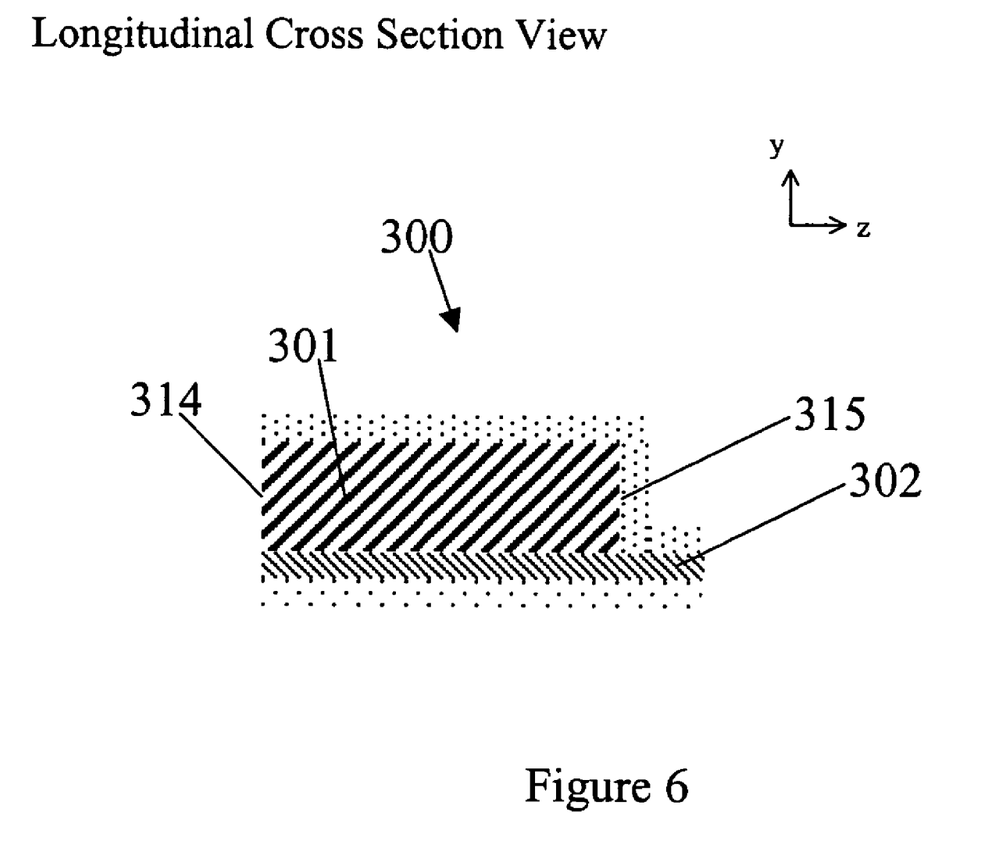
FIG. 6 shows a longitudinal cross sectional view of one embodiment of present mode shape transformer invention.
Figure 9A:
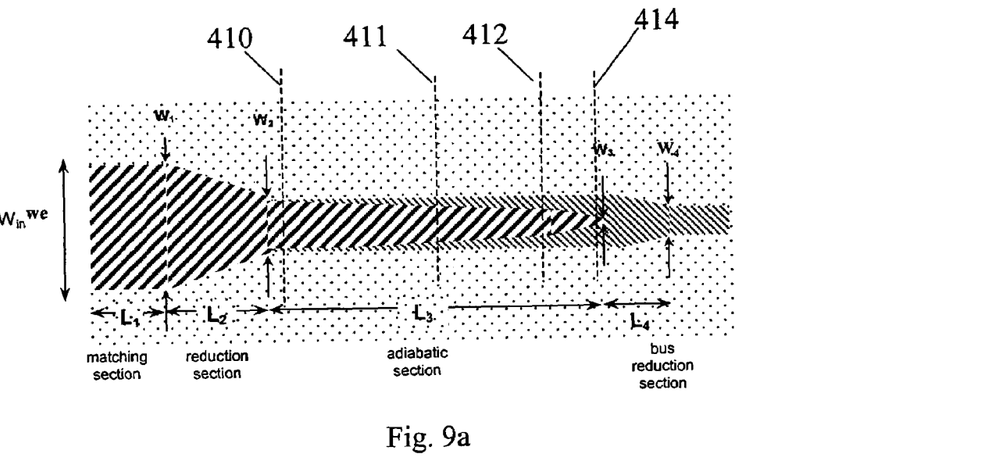
FIG. 9 shows a detailed simulation of the optical field propagating in the mode shape transformer.
Figure 9B:
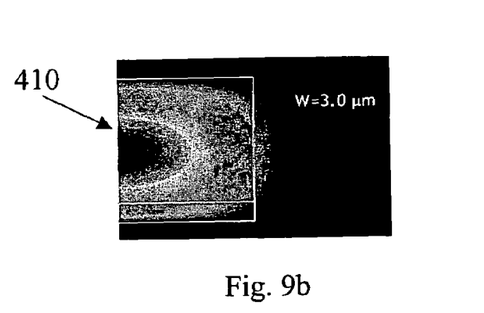
Figure 9C:
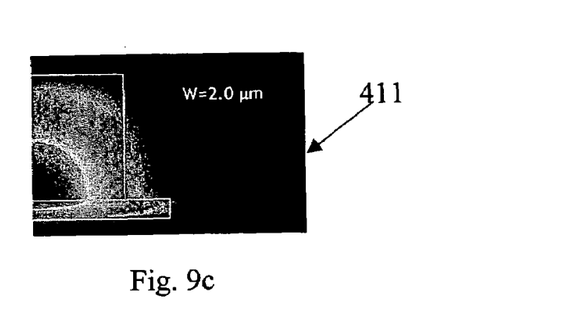
Figure 9D:
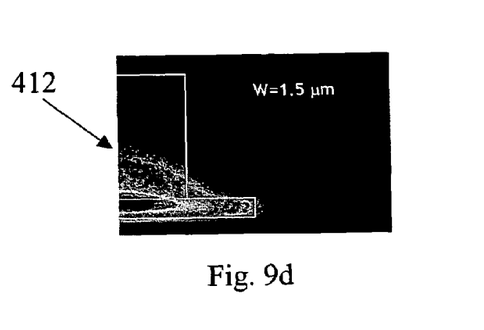
Figure 9E:
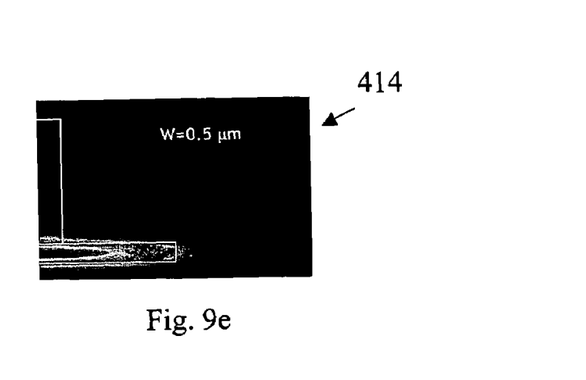

Section 4. Bus guide reduction section. The bus width reduction section is shown in FIG. 4 (307). A cross section of the bus width reduction section along the dashed line in FIG. 4 (311) is shown in FIG. 5d (311). In section 4, the bottom bus waveguide is tapered down from width $W_2$ to width $W_4$, over a length of $L_4$, as shown in FIG. 4 (307).

Typically, $W_4$ will be the desired bus width used throughout the rest of the optical circuit. The length $L_4$ is chosen long enough so that there is no optical loss in this taper section. The taper shape of the width reduction section in FIG. 4 is shown to be linear, but can be other shapes such as parabolic or exponential. The taper shape can be optimized to maximize transformer efficiency and/or minimize transformer length. Section 4 is not part of the mode transformer strictly speaking because at the start of section 4, all of the optical power is already in the bus waveguide, which was the objective of the invention. Section 4 is merely added to emphasize that the width of the bus layer can be adjusted to accommodate the preferred width for the rest of the optical circuit.

To summarize, the mode shape transformer works in the following way. An optical fiber is brought up to the input of the mode transformer so as to lie parallel on the same axis as the mode transformer, and to be laterally and vertically positioned so that the input end of the mode transformer can accept all the input light from the fiber with low loss. The dimensions of the mode transformer at the input end (301) are such that, when the fiber is properly positioned, all of the optical power in the fiber is captured. The field in the mode transformer continues to propagate axially down the device. The width of the mode transformer, including the top and bottom waveguides, is tapered down to a more narrow dimension. Following this section only the top waveguide portion of the mode transformer is further reduced, possibly at a different rate or at multiple rates, over some length. Over this length the optical power evolves from being substantially all in the top waveguide to substantially being all in the bottom waveguide. The taper rate in this section in conjunction with the final width of the top waveguide is such so as to induce low loss and to cause this mode evolution from the top guide into the bottom guide.

FIG. 9 shows a numerical simulation of the optical field at various positions within the mode transformer. The numerical simulations were carried out using the Finite-Difference Beam Propagaiton Method which is well known in the art and also available commercially, (for example, by Rsoft Inc. of Ossining, N.Y., and Apollo Photonics Inc. of Burlington, Ontario, Canada). FIG. 9*a* shows a top down view of the simulated structure. FIGS. 9*b* to 9*e* show the field at various cross sections corresponding to the dashed lines in FIG. 9*a* (410, 411, 412, 413). The field shown in FIG. 9*b* matches that of a predetermined fiber spot size. As shown in FIGS. 9*c*, 9*d*, and 9*e*, as the upper waveguide layer width becomes narrower, the optical field essentially gets pushed down into the lower waveguide layer. Near the end of the upper waveguide tapered region (414, and similar to FIG. 3, 315), substantially all of the optical power is located in the lower waveguide.

Method of Fabrication

Figure 71:
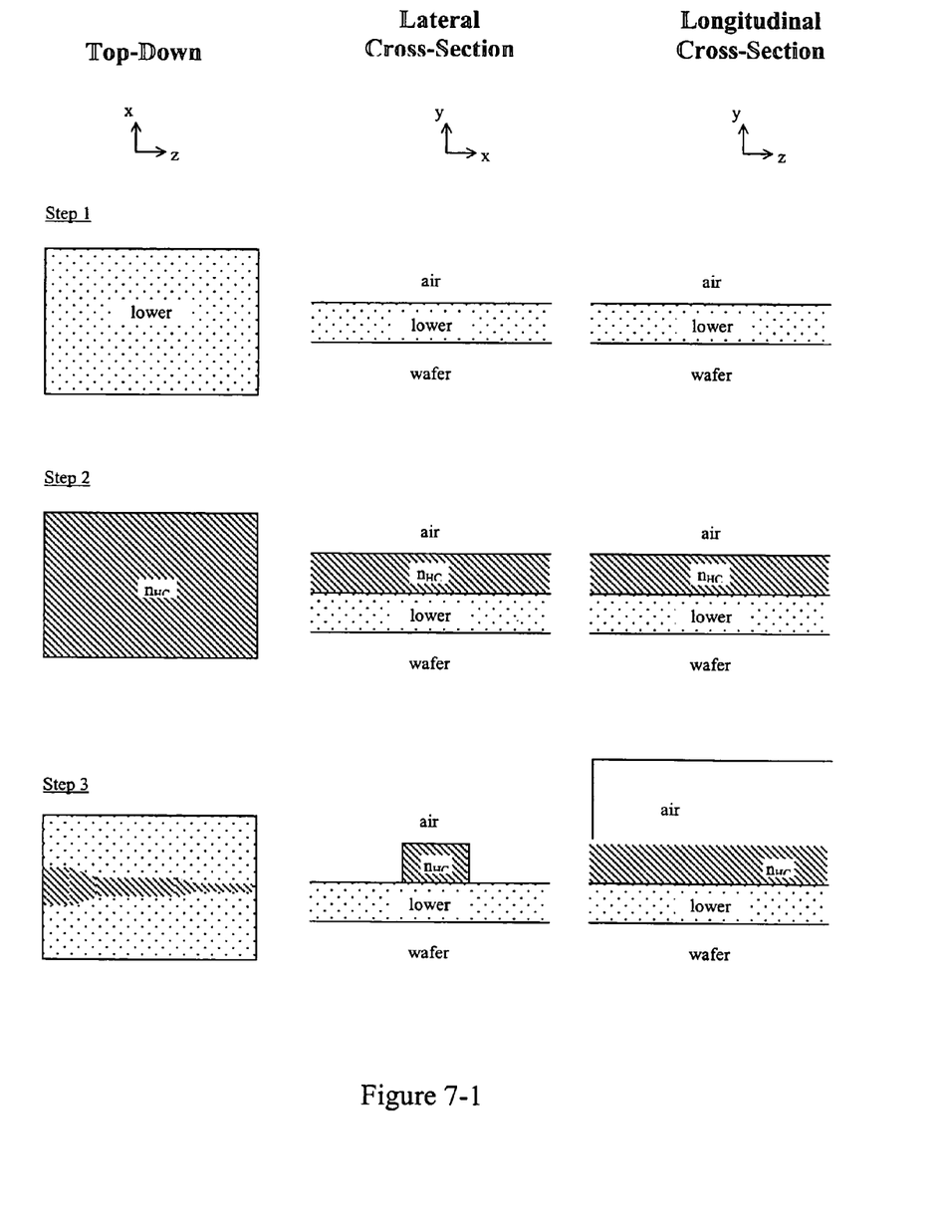
Figure 72:
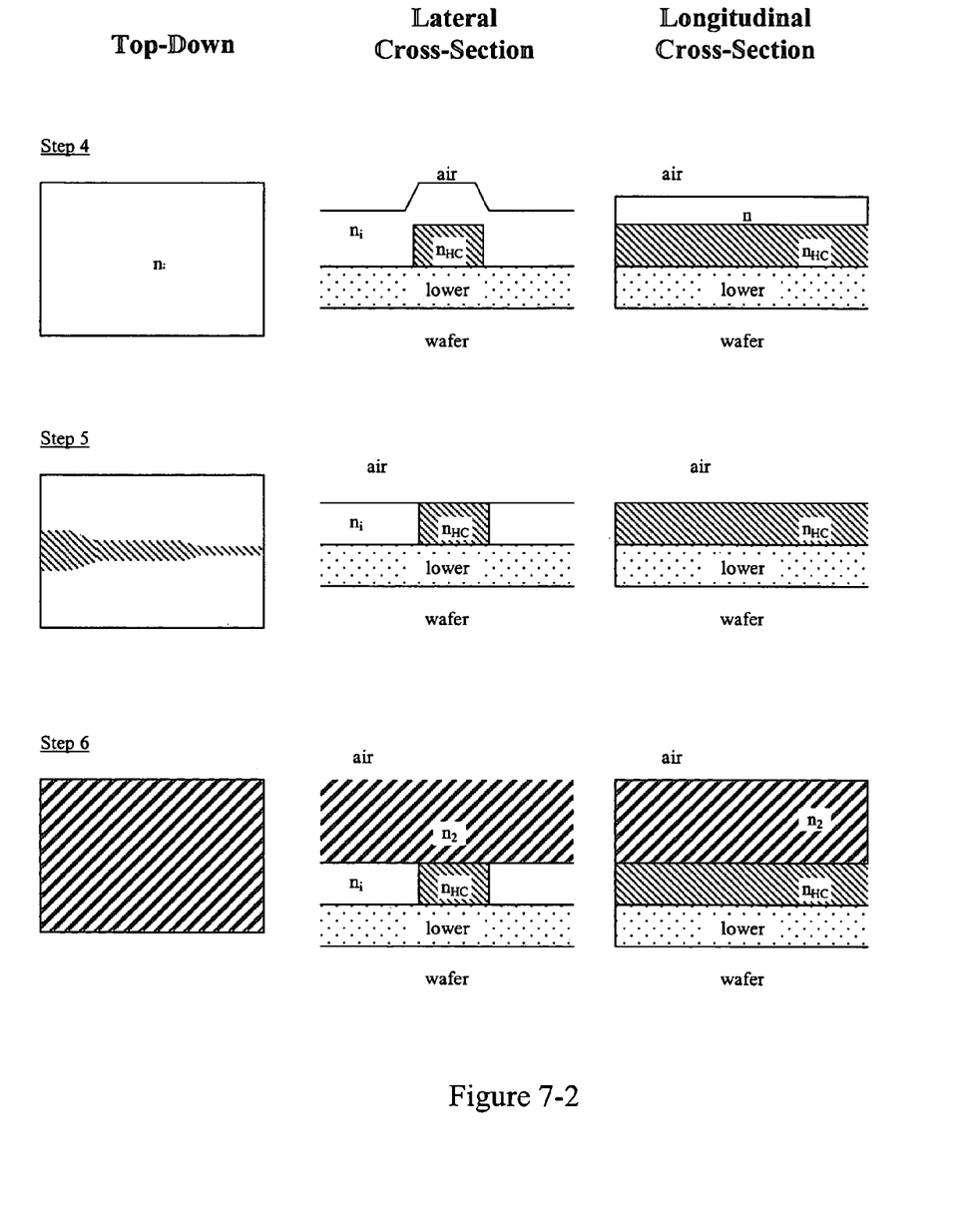
Figure 73:
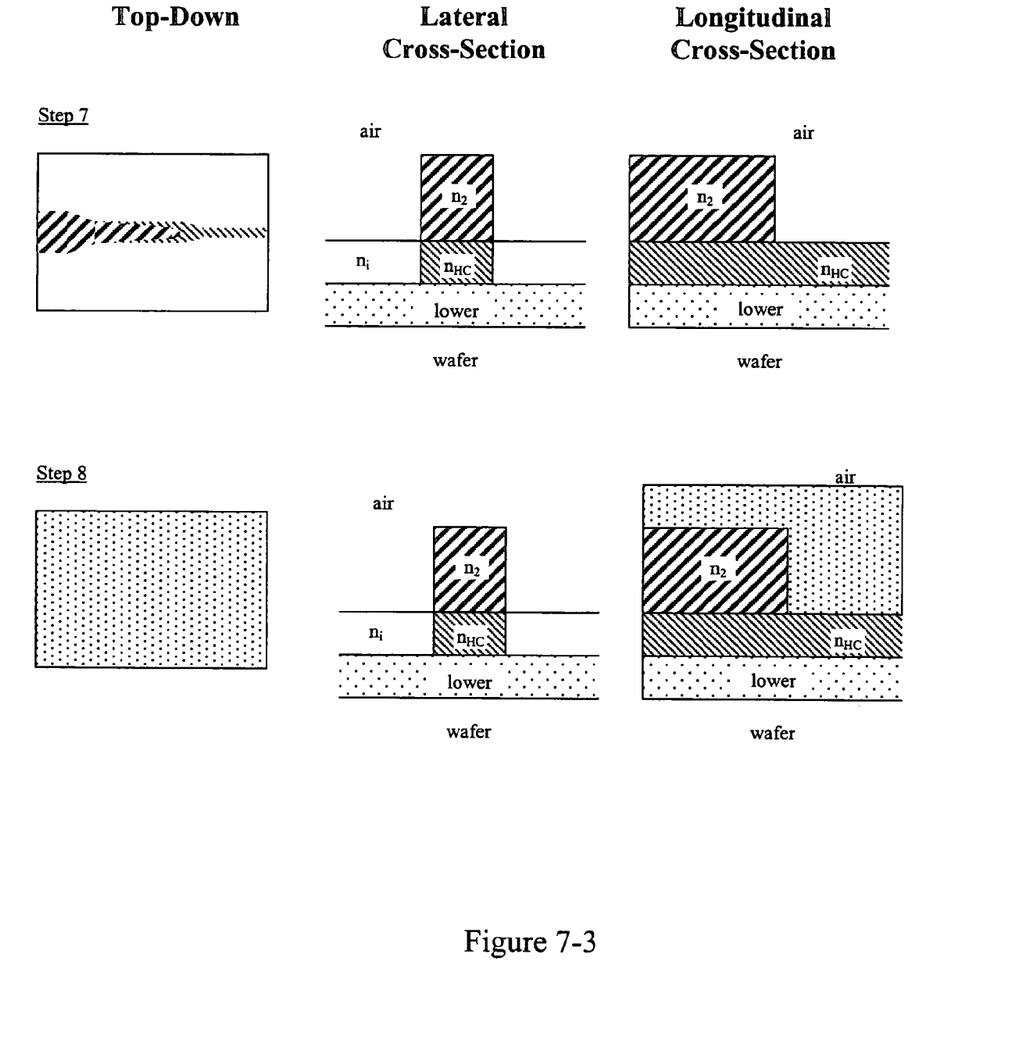
Figure 81:
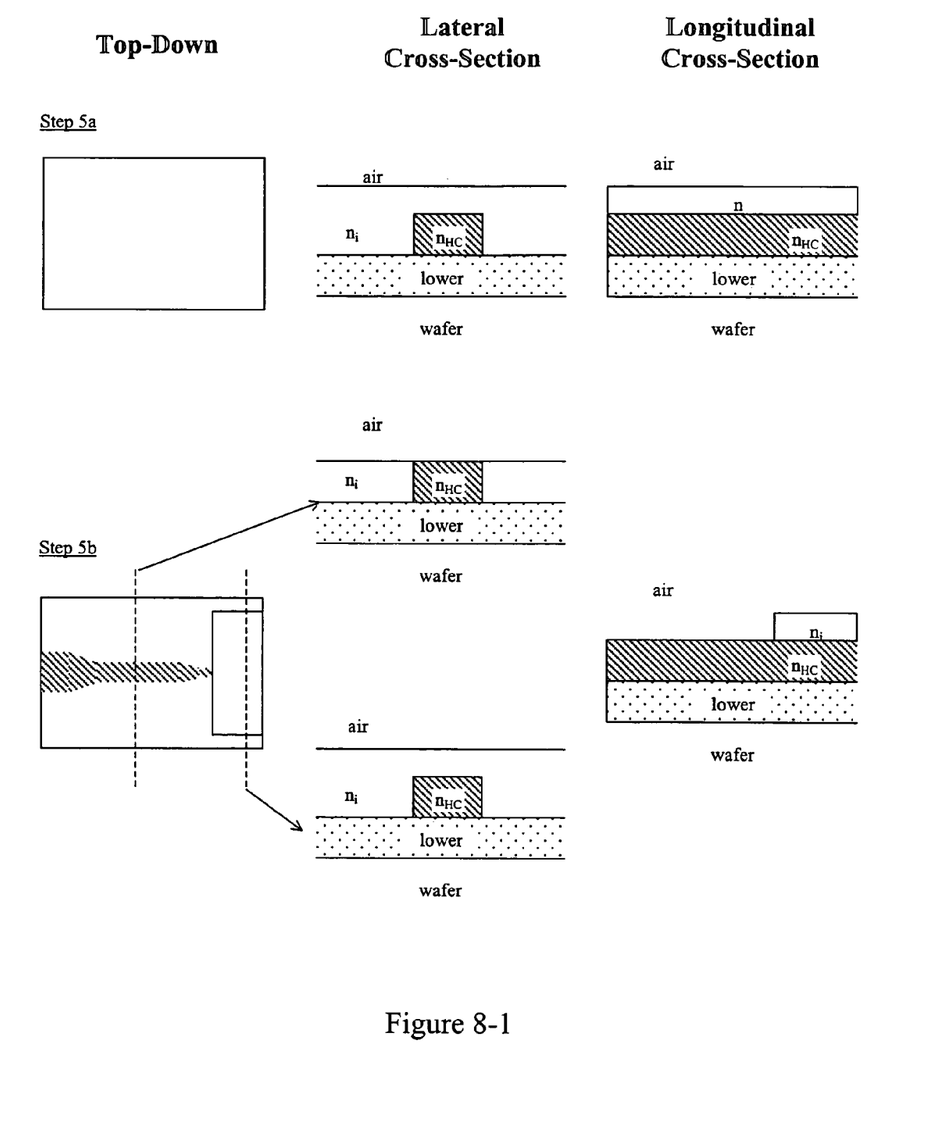
Figure 82:
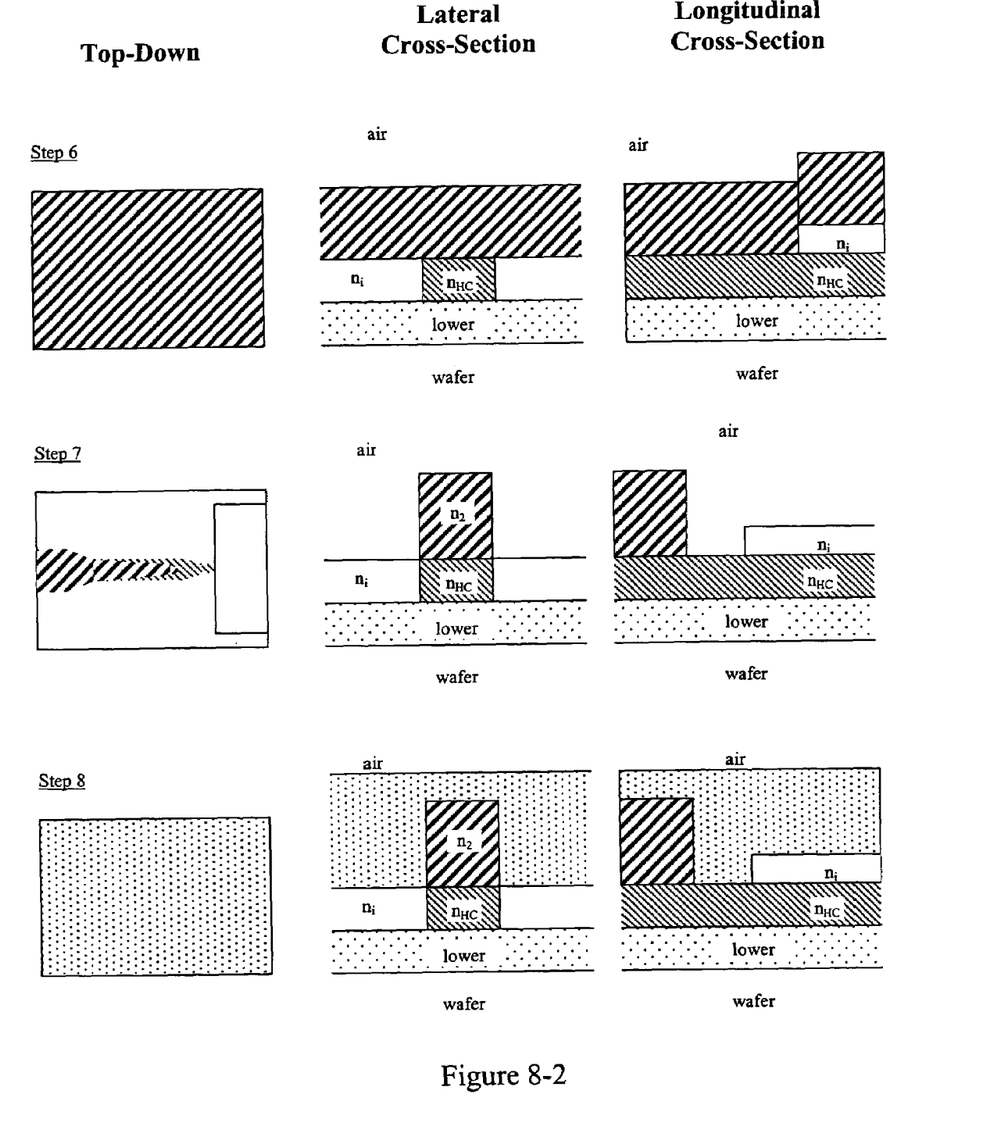

The method of fabrication described here relates to the sequence of steps illustrated in FIGS. 7-1, 7-2, and 7-3. The three columns in FIGS. 7-1 to 7-3 show the top down view, the lateral cross section view, and the longitudinal cross section view. The longitudinal cross section is along the center axis of the waveguide. There are some novel fabrication steps, as well as some more conventional steps. Details of conventional fabrication techniques may be found in Hiroshi Nishihara, Masamitsu Haruna, Toshiaki, Suhara, "Optic integrated circuits" McGraw-Hill, 1985.

Step 1. A substrate wafer is chosen as a carrier onto which various dielectric layers will be deposited or grown. Common substrates include silicon, quartz, and indium phosphide. Often, a lower cladding material is deposited or grown on the substrate for the purpose of acting as a lower cladding or buffer to shield the optical mode from the substrate. A typical buffer layer on silicon is silicon dioxide as used in the present invention. The first step in FIG. 7-1 shows a cross section of a wafer with a lower clad. The lower clad is typically 3 μm to 15 μm thick.

Step 2. The core layer of the High Contrast (HC) waveguide is deposited as a thin film. Common deposition techniques include chemical vapor deposition (CVD), sputtering, flame hydrolysis deposition, epitaxial growth, ebeam deposition, and spin on glasses or polymers. Common materials that form the core are doped silica, silicon, silicon nitride, silicon oxynitride, compound glasses such as tantalum-oxide:silica ($Ta_2O_5:SiO_2$), spin on glass, optical polymers, and quaternary compounds such as aluminum-gallium-arsenide-phosphide. The amount of material deposited is determined by design requirements, and is well controlled in the deposition steps. The second step in FIG. 7-1 shows a cross section of the chip with a thin film layer of core material used for the HC waveguide. In the present invention, the core is silicon oxynitride with $n_{HC}$=1.65.

Step 3. Photoresist is spun onto the wafer, and the optical circuit layout is photographically patterned into the photoresist. The pattern comes from a design mask that is used as a photographic plate. The design includes any tapering within the mode transformer sections for the HC layer. The photoresist pattern is transferred into the HC layer by standard etching techniques that use the photoresist as a mask. Etching techniques include chemical wet etching or reactive ion etching. After pattern transfer, the remaining photoresist is stripped away, leaving a ridge or strips of HC core material that form the core of the HC optical circuit. The third step in FIG. 7-1 shows a cross section of the chip after the HC thin film layer has been etched, and the photoresist has been stripped off.

Step 4. An intermediate cladding material with index $n_i$ is deposited or grown on the surface of the wafer covering the HC waveguide to a thickness greater than the core depth. This material can be any described in the previous steps, but will have an index that is lower than that of the HC layer (that is $n_i<n_{HC}$). Because of the topography, the top surface of this layer may not be planar. For example, there may be a ridge over the waveguide, as depicted in step 4 of FIG. 7-2. Step 4 in FIG. 7-2 shows a cross section of the chip after top cladding material has been deposited over the wafer.

Step 5. It is desired to have the HC waveguide encapsulated in the cladding material on all sides, except for the top surface of the HC waveguide. Therefore, the cladding that was deposited in step 4 must be removed down to a thickness of the HC waveguide height. Although not absolutely necessary, it is desirable that the top surface be planarized to give a flat surface across the chip or wafer. The top cladding can be planarized by well known techniques such as etch back and/or polishing. It is important to make sure that there is no cladding material left on the top surface of the HC waveguide after planarization. Remaining material would interfere with the power transfer mechanism. The fifth step in FIG. 7-2 shows a cross section of the chip after planarization down to the top surface of the HC waveguide.

Step 6. Similar to step 2, material is deposited or grown over the surface of the wafer. This material will comprise the second, or top core layer and will have a refractive index of $n_2$. Any of the foregoing materials discussed in the previous steps may comprise this second core layer. In general, the index of this material will be close to, but not necessarily equal to, the index of the HC waveguide. Step 6 of FIG. 7-2 shows a cross section of the chip after the second core layer is deposited.

Step 7. Similar to step 3, photoresist is spun onto the wafer, and the second core layer is photographically patterned. The pattern is transferred to the second core layer by etching the material. The photoresist is stripped away, resulting in ridges that are now the second core layer, and which lie directly above the first core layer. Any tapering within the mode transformer section for the second core is contained on the lithographic mask. Step 7 in FIG. 7-3 shows a cross section of the chip after material for the second core layer has been etched, and the photoresist has been stripped.

Step 8. Finally, cladding material is deposited over the entire wafer. Step 8 in FIG. 7-3 shows a cross section of the wafer with a top cladding layer deposited over the entire surface. The surface of the top layer may or may not be planar. If a planar surface is desired, planarization techniques similar to those described in Step 5 may be used.

As highlighted in step 5 of FIG. 7-2 in the transformer region of the chip, it is important that there be little or no cladding material left on the top surface of the HC waveguide after planarization. Also, it is important that there be no second core layer material left on the chip surface after etching except where the mode transform resides. That is, the second core must be etched all the way through its height. These foregoing planarization and etching steps needed to remove material might affect the HC waveguide core. For example, either over-planarizing or over-etching may reduce the thickness of the HC core layer. This in turn might affect the rest of the optical circuit performance (although it will generally not affect the performance of the mode transformer). In order to protect the rest of the HC optical circuit, step 5 might be modified as shown in FIGS. 8-1 and 8-2. In modified Step 5a, FIG. 8-1, the first cladding layer is planarized, but not down to the top surface of the HC waveguide. There is some material remaining above the HC guide in order to protect it. Next, in Step 5b, FIG. 8-1, the portion of the HC optical circuit not containing the mode transformer is masked off (protected), and the planarization or etching is continued down to the top surface of the HC guide. In this way, all the cladding material is removed down to the top surface of the HC waveguide in that portion of the circuit that contains the mode transformer, while in all other portions of the circuit, there is a protective layer of cladding over the HC guide. The remaining steps 6 to 8 in FIG. 8-2 are similar to those described previously in FIGS. 7-2 and 7-3, and the resulting views are shown in FIG. 8-2.

While the preferred embodiments have been described, it will be apparent to those skilled in the art that various modifications may be made to the embodiments without departing from the spirit of the present invention. Such modifications are within the scope of this invention.

What is claimed is:

1. An optical chip connectable to a waveguide having a spot size, the optical chip comprising:
   a substrate;
   an optical circuit on the substrate; and
   an optical mode transformer on the substrate and having an input for coupling to the waveguide, and an output coupled to the optical circuit, the optical mode transformer, comprising:
   a first waveguide layer having a first thickness and being constructed of a high contrast waveguide, the first waveguide layer coupled to the optical circuit; and
   a second waveguide layer, at least a portion of the second waveguide layer being contiguous with at least a portion of the first waveguide layer, the first and second waveguide layers together forming a composite waveguide having a mode matching section adjacent to the input of the optical mode transformer, the mode matching section having a spot size matching the spot size of the waveguide to capture light from the waveguide, and an adiabatic section in which the second waveguide layer is tapered, with a larger end of the second waveguide layer receiving light from the mode matching section and a mode size of propagating light in the second waveguide layer being reduced along the taper of the second waveguide layer to couple the propagating light into the first waveguide layer and to the optical circuit on the substrate.

2. The optical chip of claim 1, wherein the composite waveguide further defines a lateral mode reduction section between the mode matching section and the adiabatic section and wherein both the first and second waveguide layers are simultaneously reduced in the lateral mode reduction section.

3. The optical chip of claim 1 wherein the first and second waveguide layers are constructed of materials having a similar refractive index.

4. The optical chip of claim 1 wherein the first and second waveguide layers are constructed of materials having different refractive indexes.

5. A method of fabricating an optical chip, comprising the steps of:
   depositing a first waveguide and an optical circuit on a substrate such that the first waveguide is connected to the optical circuit, the first waveguide being constructed of a high contrast waveguide and having a first thickness and a first refractive index; and
   fabricating a second waveguide having a second thickness and a second refractive index on the first waveguide where at least a portion of the second waveguide is contiguous with at least a portion of the first waveguide and the second waveguide having a width that is tapered inwardly toward the optical circuit, a portion of the first and second waveguides forming a mode matching section positioned to receive tight from an external waveguide positioned externally of the optical chip, the mode matching section having a cross-sectional size matching a cross-sectional size of the external waveguide.

6. The method of claim 5 comprising the further step of forming the first and second waveguides with materials having similar refractive indexes.

7. The method of claim 5 comprising the further step of forming the first and second waveguides with materials having different refractive indexes.

8. The method of claim 5 wherein the first and second waveguides having a width in the mode matching section corresponding to that of the external waveguide.

9. The method of claim 8 wherein the sum of the first thickness of the first waveguide and the second thickness of the second waveguide are similar to the fiber spot size.

10. A method of coupling an input optical signal from a fiber into an integrated optical high index contrast first waveguide of an optical chip having a spot size different from that of the fiber, comprising the steps of:

aligning the fiber with a mode matching section of an integrated optical mode transformer of the optical chip, the mode matching section having a spot size matching the snot size of the fiber, the integrated optical mode transformer also including a second waveguide contiguous with the first waveguide to form a composite waveguide, the composite waveguide having an adiabatic section in which the second waveguide tapers inwardly relative to the first waveguide to reduce the mode size of propagating light in the second waveguide layer and to cause optical power of the input optical signal to transfer from the second waveguide to the first waveguide; and securing the optical mode transformer in the aligned position.

11. The method of claim 10 wherein the optical mode transformer is defined further wherein the composite waveguide formed from the first and second waveguides defines a lateral mode reduction section between the mode matching section and the adiabatic section and wherein both the first and second waveguides are simultaneously reduced in the lateral mode reduction section.

12. The method of claim 10 wherein in the mode matching section the first and second waveguides each have a width corresponding to that of a predetermined fiber spot size.

13. The method of claim 10 wherein the first and second waveguides are constructed of materials having a similar refractive index.

14. The method of claim 10 wherein the first and second waveguides are constructed of materials having different refractive indexes.

15. The method of claim 10 wherein a width of the second waveguide tapers to a terminal end along the adiabatic section.

16. The method of claim 15 wherein a width of the first waveguide is not tapered along the adiabatic section.

17. The method of claim 10 wherein the first and second waveguides have respective lengths where the length of the second waveguide is less than the length of the first waveguide forcing the propagating light to evanescently couple into the first waveguide.

* * * * *